US010074126B2

(12) United States Patent
Gopalsamy et al.

(10) Patent No.: US 10,074,126 B2
(45) Date of Patent: Sep. 11, 2018

(54) METHODS AND SYSTEMS FOR PROVIDING SHOPPING SUGGESTIONS TO IN-STORE CUSTOMERS

(71) Applicant: Wal-Mart Stores, Inc., Bentonville, AR (US)

(72) Inventors: Srikannan Gopalsamy, Foster City, CA (US); Vasu Palanisamy, Union City, CA (US); Chandrasekar Ramalingam, Union City, CA (US); Shanmuga Sundaram Sowndara Rajan, Fremont, CA (US); Dharani Prasad Pannam, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 885 days.

(21) Appl. No.: 14/502,392

(22) Filed: Sep. 30, 2014

(65) Prior Publication Data

US 2016/0092961 A1    Mar. 31, 2016

(51) Int. Cl.
*G06Q 30/00* (2012.01)
*G06Q 30/06* (2012.01)

(52) U.S. Cl.
CPC .............. *G06Q 30/0631* (2013.01)

(58) Field of Classification Search
CPC .......................................... G06Q 30/06–30/08
USPC ................................. 705/26.1–27.2
See application file for complete search history.

(56) References Cited

U.S. PATENT DOCUMENTS

2006/0259371 A1* 11/2006 Perrier .............. G06F 17/30595
                                                            705/27.1
2013/0218721 A1* 8/2013 Borhan ................ G06Q 20/322
                                                            705/26.41

OTHER PUBLICATIONS

Orgel, D., "Four Ways Supermarkets are Revamping Websites" (Supermarket News 58.31, Aug. 2, 2010) https://dialog.proquest.com/professional/docview/742154347?accountid=142257 (Year: 2010).*

* cited by examiner

*Primary Examiner* — Ethan D Civan
(74) *Attorney, Agent, or Firm* — Bryan Cave Leighton Paisner LLP

(57) ABSTRACT

Various examples of methods and systems for providing shopping suggestions to in-store customers are described. In one implementation, a method may analyze store information specific to a store and customer information associated with a customer. The method may also identify one or more items as recommendation for the customer based on the analyzing. The method may further indicate the one or more items on a map of the store.

20 Claims, 4 Drawing Sheets

METHODS AND SYSTEMS FOR PROVIDING SHOPPING SUGGESTIONS TO IN-STORE CUSTOMERS

TECHNICAL FIELD

The present disclosure relates to methods and systems for providing shopping suggestions to in-store customers.

BACKGROUND

One way for a store to increase its sales revenue, thereby increasing its profits, is to promote select products to customers who visit the store by, for example, promotional advertisement and/or special discounts. However, a one-size-fits-all approach may not work effectively. For example, if a store promotes certain products (e.g., soft drinks) while a given customer is interested in shopping for a different type of product (e.g., toiletry), the promotion may not affect the customer's buying decision and hence may not result in increased sales for the store.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
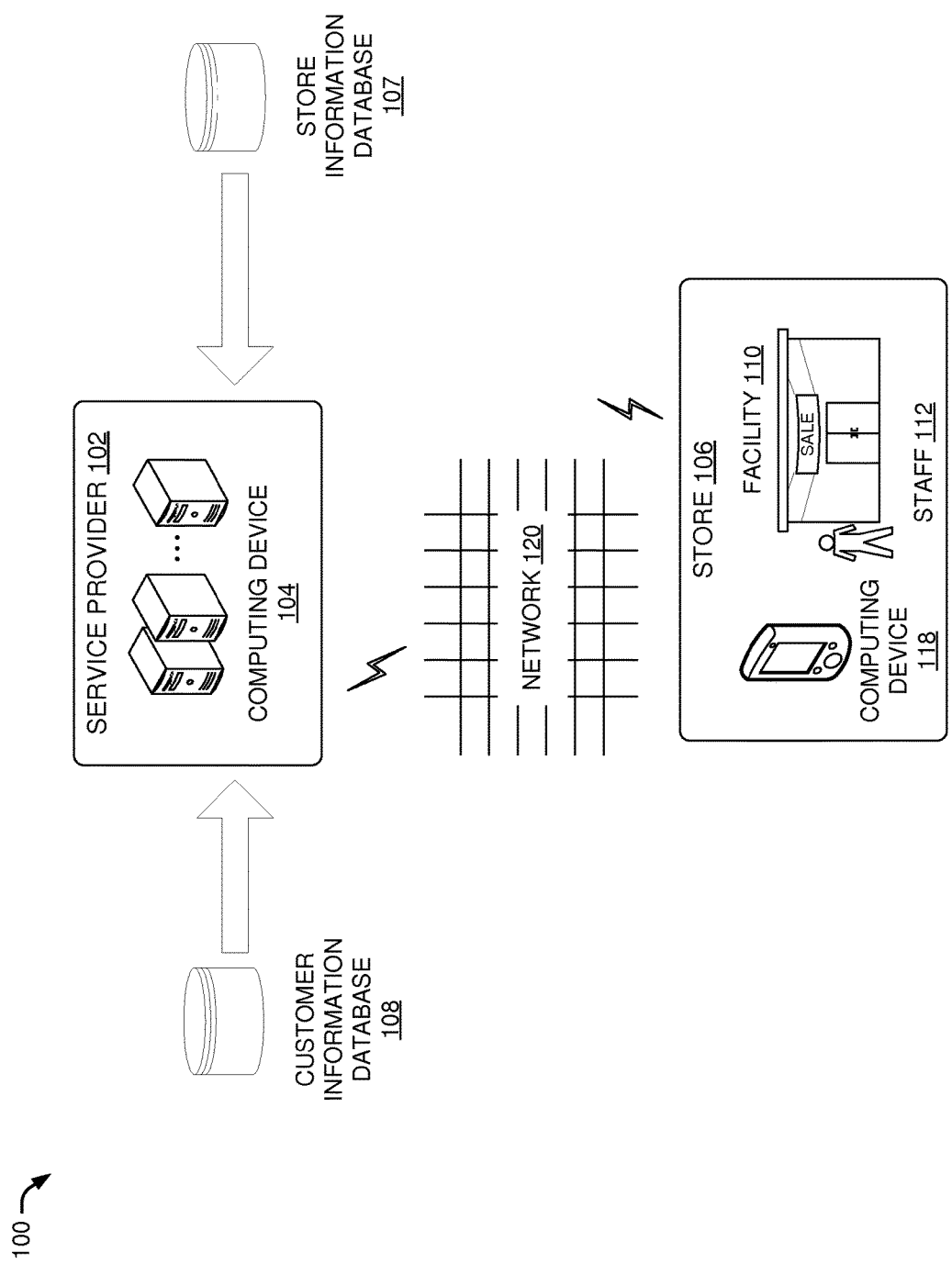
FIG. 1 is a block diagram depicting an example computing environment within which example embodiments of providing shopping suggestions to in-store customers of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a block diagram depicting an example computing environment 100 within which an example embodiment of the present disclosure may be implemented. Example computing environment 100 includes a computing device 104, e.g., server, associated with a service provider 102. Service provider 102 may provide a service related to providing shopping suggestions and personalized discounts to in-store customers for a store 106. For example, the service may include a set of related software and/or hardware functionalities that, together with certain policies set by service provider 102, enable staff 112, e.g., store associates, working at a facility 110 of store 106 to provide shopping suggestions and personalize discounts to in-store customers.

In some embodiments, computing device 104 may receive store information specific to a store and customer information associated with a customer. For example, computing device 104 may receive store information specific to store 106 from a store information database 107. Computing device 104 may also receive customer information associated with one or more customers (not shown) from a customer information database 108. Although store information database 107 and customer information database 108 are depicted as discrete databases, in some embodiments a single database may be utilized to implement both the store information database 107 and customer information database 108.

Computing device 104 may also identify one or more items as recommendation for the customer based on the store information and the customer information. In some embodiments, the one or more items may include one or more products, accessories or services available in the store and relevant to the customer based on the store information and the customer information. For example, based on the store information specific to store 106 and the customer information associated with the customer, computing device 104 may identify one or more products and/or services to be recommended to the customer.

Computing device 104 may utilize an algorithm to algorithmically analyze store information specific to store 106 and customer information associated with one or more customers to identify relevant products, accessories and services available in store 106. In some embodiments, the customer information associated with the customer may include information on one or more previous orders by the customer, demographics of the customer, shopping history of the customer, and shopping pattern of one or more other customers. In some embodiments, the store information specific to the store may include information on store-specific rollbacks and deals, store floor plan/layout, stocking plan indicative of which items and/or types of items are displayed on which shelves within the store, etc. In some embodiments, the customer information associated with the customer may additionally or alternatively include information on social activities of the customer at one or more social networking platforms. In some embodiments, in analyzing the customer information associated with the customer, computing device 104 may identify the one or more items based at least in part on the information on social activities of the customer.

Computing device 104 may also analyze the store information to determine a location of the one or more items with the store. For example, computing device 104 may analyze store information specific to store 106, such as floor plan/layout of store 106 and/or stocking plan indicative of which items and/or types of items are displayed on which shelves within store 106, to determine where in store 106 the one or more products and/or services to be recommended to the customer are located.

Computing device 104 may further indicate the one or more items on a map of the store. For example, computing device 104 may indicate the one or more products and/or services, to be recommended to the customer, on a map displayed on a computing device 118 operated by staff 112. In turn, staff 112, or store associates, may show the map to the customer. This would allow the customer to easily find the recommended products and/or services within store 106.

Computing device 104 may also identify one or more additional items for sale at a discount to the customer based at least in part on a shopping history of the customer. For example, more discounts for one or more products that the customer frequently purchases may be given.

The proposed scheme enables store associates to up-sell and cross-sell relevant store-specific products when customers are in the store for services such as, for example, in-store pickup, returns, exchanges and/or one or more other customer services, etc. This would likely help increase store revenue and profit.

Figure 2:
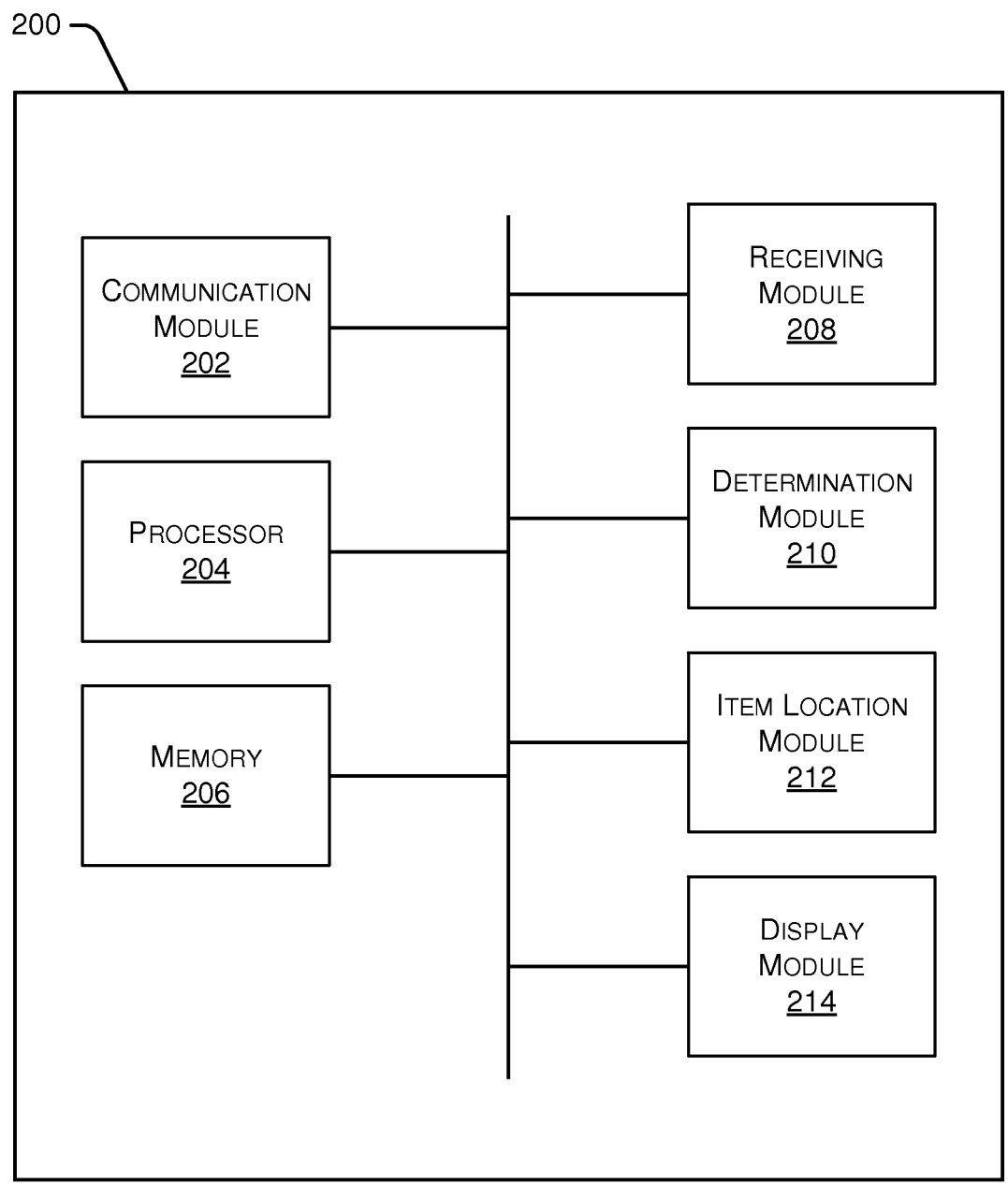
FIG. 2 is a block diagram depicting an embodiment of an apparatus configured to implement example embodiments of providing shopping suggestions to in-store customers of the present disclosure.

FIG. 2 is a block diagram depicting an embodiment of a computing device 200 configured to implement systems and methods of the present disclosure. Computing device 200 (e.g., computing device 104) performs various functions related to recommending items based on geographic information and user activities, as discussed herein. In some embodiments, computing device 200 may be implemented as one or more computing devices that cooperatively implement the functions described herein. Computing device 200 may include a communication module 202, one or more processors (shown as a processor 204 in FIG. 2), and a memory 206. Communication module 202 allows computing device 200 to communicate with other systems, such as communication networks, other servers, etc. Processor 204 executes one or more sets of instructions to implement the functionality provided by computing device 200. Memory 206 stores the one or more sets of instructions executable by processor 204 as well as other data used by processor 204. Computing device 200 may also include a receiving module 208, a determination module 210, an item location module 212 and a display module 214. Although the receiving module 208, determination module 210, item location module 212 and display module 214 are depicted as discrete modules separate from the processor 204, in various implementations one or more of receiving module 208, determination module 210, item location module 212 and display module 214 may be part of the processor 204.

Receiving module 208 may be configured to receive store information specific to a store and customer information associated with a customer. For example, receiving module 208 may receiving store information specific to store 106 and customer information associated with one or more customers.

Determination module 210 may be configured to identify one or more items as recommendation for the customer based on the store information and the customer information. In some embodiments, the one or more items may include one or more products, accessories or services available in the store and relevant to the customer based on the store information and the customer information. For example, based on the store information specific to store 106 and the customer information associated with the customer, determination module 210 may identify one or more products and/or services to be recommended to the customer.

In some embodiments, determination module 210 may utilize an algorithm to algorithmically analyze store information specific to store 106 and customer information associated with one or more customers. In some embodiments, the customer information associated with the customer may include information on one or more previous orders by the customer, demographics of the customer, shopping history of the customer, and shopping pattern of one or more other customers. In some embodiments, the store information specific to the store may include information on store-specific rollbacks and deals.

In some embodiments, the customer information associated with the customer may additionally or alternatively include information on social activities of the customer at one or more social networking platforms. In some embodiments, in analyzing the customer information associated with the customer, determination module 210 may identify the one or more items based at least in part on the information on social activities of the customer.

In some embodiments, determination module 210 may also identify one or more additional items for sale at a discount to the customer based at least in part on a shopping history of the customer. For example, more discounts for one or more products that the customer frequently purchases may be given.

Item location module 212 may be configured to indicate the one or more items on a map of the store. For example, item location module 212 may indicate the one or more products and/or services, to be recommended to the customer, on a map displayed on display module 214 or on another computing device, e.g., computing device 118 operated by staff 112.

Figure 3:
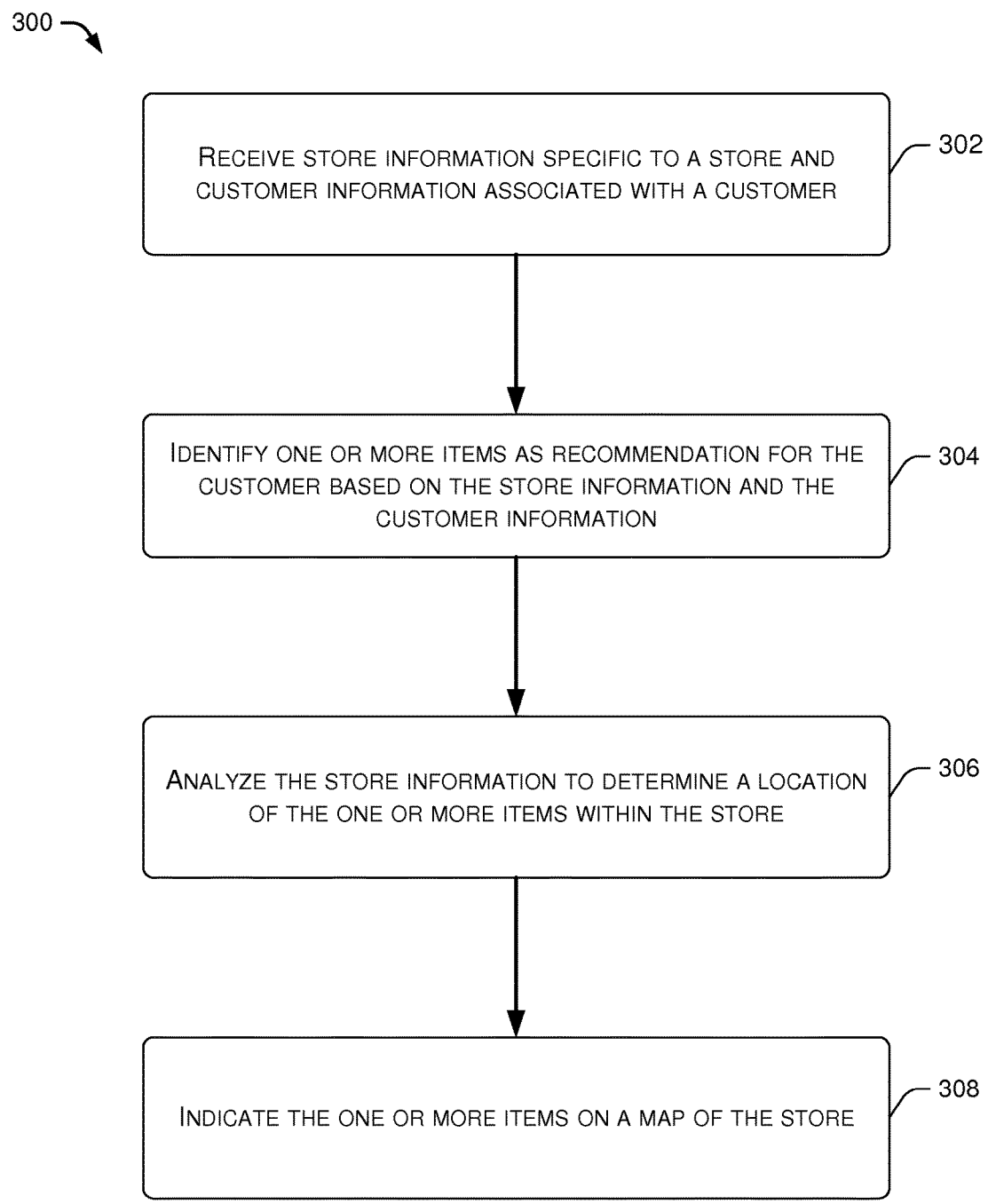
FIG. 3 is a flowchart diagram of an embodiment of a process related to providing shopping suggestions to in-store customers in accordance with an embodiment of the present disclosure.

FIG. 3 is a flowchart diagram of an embodiment of a process 300 for providing shopping suggestions and personalized discounts to in-store customers in accordance with an embodiment of the present disclosure. Example process 300 includes one or more operations, actions, or functions. Although illustrated as discrete blocks, various blocks may be divided into additional blocks, combined into fewer blocks, or eliminated, depending on the desired implementation. Process 300 may be implemented by one or more processors including, for example, computing device 200. For illustrative purposes, the operations described below are performed by one or more processors of computing device 104 as shown in FIG. 1 and/or processor 204 of computing device 200 as shown in FIG. 2.

At 302, one or more processors of computing device 104 may receive store information specific to a store and customer information associated with a customer.

At 304, the one or more processors of computing device 104 may identify one or more items as recommendation for the customer based on the store information and the customer information.

At 306, the one or more processors of computing device 104 may analyze the store information to determine a location of the one or more items within the store.

At 308, the one or more processors of computing device 104 may indicate the one or more items on a map of the store.

In some embodiments, the customer information associated with the customer may include information on one or more previous orders by the customer, demographics of the customer, shopping history of the customer, and shopping pattern of one or more other customers.

In some embodiments, the store information specific to the store may include information on store-specific rollbacks and deals.

In some embodiments, the one or more items may include one or more products, accessories or services available in the store and relevant to the customer based on the store information and the customer information.

In some embodiments, the customer information associated with the customer may include information on social activities of the customer at one or more social networking platforms.

In some embodiments, process 300 may identify the one or more items based at least in part on the information on social activities of the customer.

In some embodiments, process 300 may further include identifying one or more additional items for sale at a discount to the customer based at least in part on a shopping history of the customer.

Figure 4:
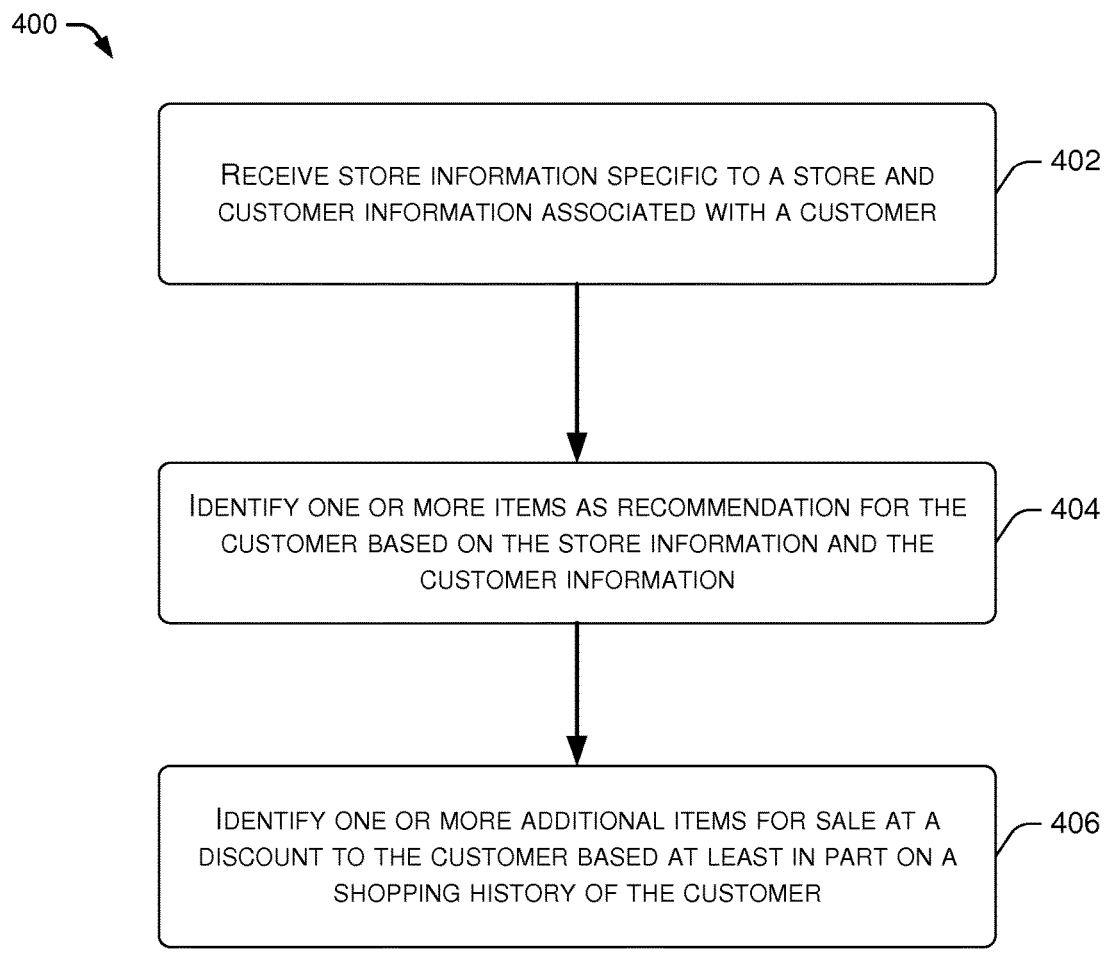
FIG. 4 is a flowchart diagram of an embodiment of a process related to providing shopping suggestions to in-store customers in accordance with another embodiment of the present disclosure.

FIG. 4 is a flowchart diagram of an embodiment of a process 400 for providing shopping suggestions and personalized discounts to in-store customers in accordance with an embodiment of the present disclosure. Example process 400 includes one or more operations, actions, or functions. Although illustrated as discrete blocks, various blocks may be divided into additional blocks, combined into fewer blocks, or eliminated, depending on the desired implementation. Process 400 may be implemented by one or more processors including, for example, computing device 200. For illustrative purposes, the operations described below are performed by one or more processors of computing device 104 as shown in FIG. 1 and/or processor 204 of computing device 200 as shown in FIG. 2.

At 402, one or more processors of computing device 104 may receive store information specific to a store and customer information associated with a customer.

At 404, the one or more processors of computing device 104 may identify one or more items as recommendation for the customer based on the store information and the customer information.

At 406, the one or more processors of computing device 104 may identify one or more additional items for sale at a discount to the customer based at least in part on a shopping history of the customer.

In some embodiments, the customer information associated with the customer may include information on one or more previous orders by the customer, demographics of the customer, shopping history of the customer, and shopping pattern of one or more other customers.

In some embodiments, the store information specific to the store may include information on store-specific rollbacks and deals.

In some embodiments, the one or more items may include one or more products, accessories or services available in the store and relevant to the customer based on the store information and the customer information.

In some embodiments, the customer information associated with the customer may include information on social activities of the customer at one or more social networking platforms.

In some embodiments, process 400 may identify the one or more items based at least in part on the information on social activities of the customer.

In some embodiments, process 400 may further include indicating the one or more items on a map of the store displayed on a computing device.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method of providing shopping suggestions to in-store customers, the method comprising:
   receiving, by one or more processors of a computing system, via a network, (a) store information specific to a brick and mortar store from a store information database, and (b) customer information associated with an in-store customer from a customer information database, wherein:
      the store information comprises a price rollback, a store floor plan, and a stocking plan showing where items are displayed on particular shelves within the brick and mortar store; and
      the customer information comprises one or more previous orders, demographics, shopping history, and social networking platforms;
   transmitting, by the one or more processors, instructions for displaying the store information and the customer information to one or more computing devices of store sales associates working at the brick and mortar store to provide the shopping suggestions and to personalize discounts to the in-store customer associated with a customer service transaction at the brick and mortar store, the customer service transaction comprising an in-store pickup, a return, or an exchange;
   transmitting, by the one or more processors, instructions for displaying locations of one or more of the items on a map of the brick and mortar store to be displayed on user interfaces of the one or more computing devices of the store sales associates to present to the in-store customer;
   personalizing, by the one or more processors, a custom discount based on one or more shopping patterns of one or more other customers for the one or more of the items frequently purchased by the one or more other customers and the in-store customer;
   identifying, by the one or more processors, one or more additional items for sale at an additional discount to the in-store customer as a recommendation for the in-store customer based on the store information and the customer information, wherein the one or more additional items, as recommended, comprise one or more products, accessories, or services available in the brick and mortar store;
   analyzing the store information to determine a location of the one or more of the items and the one or more additional items within the brick and mortar store; and
   transmitting, by the one or more processors, instructions for changing the user interfaces of the one or more computing devices of the store sales associates to add additional locations of the one or more additional items on the map of the brick and mortar store so that the store sales associates can present the additional locations to the in-store customer.

2. The method of claim 1, wherein the customer information associated with the in-store customer further comprises customer information associated with the one or more other customers stored in the customer information database.

3. The method of claim 1, wherein the store information specific to the brick and mortar store comprises information on store-specific deals.

4. The method of claim 1, wherein the one or more additional items comprise the one or more products, accessories or services available in the brick and mortar store and relevant to the in-store customer based on the store information and the customer information.

5. The method of claim 1, wherein the customer information associated with the in-store customer comprises information on social activities of the in-store customer at one or more of the social networking platforms.

6. The method of claim 5, wherein the identifying the one or more additional items comprises identifying the one or more additional items based at least in part on the information on the social activities of the in-store customer.

7. The method of claim 1, wherein:
   identifying the one or more additional items for sale at the additional discount to the in-store customer also is based at least in part on the shopping history of the in-store customer.

8. One or more computer-readable media storing computer-executable instructions that, when executed on one or more processors, causes the one or more processors to perform operations comprising:
   receiving (a) store information specific to a brick and mortar store from a store information database, and (b) customer information associated with an in-store customer from a customer information database, wherein:
      the store information comprises a price rollback, a store floor plan, and a stocking plan showing where items are displayed on particular shelves within the brick and mortar store; and
      the customer information comprises one or more previous orders, demographics, shopping history, social networking platforms, and shopping patterns of one or more other customers;
   transmitting instructions for displaying the store information and the customer information to one or more computing devices of store sales associates working at the brick and mortar store to provide shopping suggestions and to personalize discounts to the in-store customer associated with a customer service transaction at the brick and mortar store, the customer service transaction comprising an in-store pickup, a return, or an exchange;
   transmitting instructions for displaying locations of one or more of the items on a map of the brick and mortar store to be displayed on user interfaces of the one or more computing devices of the store sales associates to present to the in-store customer;
   personalizing a custom discount based on one or more shopping patterns of the one or more other customers for the one or more of the items frequently purchased by the one or more other customers and the in-store customer;
   identifying one or more additional items for sale at an additional discount to the in-store customer as a recommendation for the in-store customer based on the store information and the customer information, wherein the one or more additional items, as recommended, comprise one or more products, accessories, or services available in the brick and mortar store;

analyzing the store information to determine a location of the one or more of the items and the one or more additional items within the brick and mortar store; and transmitting instructions for changing the user interfaces of the one or more computing devices of the store sales associates to add additional locations of the one or more additional items on the map of the brick and mortar store so that the store sales associates can present the additional locations to the in-store customer.

9. The one or more computer-readable media of claim 8, wherein the customer information associated with the in-store customer further comprises customer information associated with the one or more other customers stored in the customer information database.

10. The one or more computer-readable media of claim 8, wherein the store information specific to the brick and mortar store comprises information on store-specific deals.

11. The one or more computer-readable media of claim 8, wherein the one or more additional items comprise the one or more products, accessories or services available in the brick and mortar store and relevant to the in-store customer based on the store information and the customer information.

12. The one or more computer-readable media of claim 8, wherein the customer information associated with the in-store customer comprises information on social activities of the in-store customer at one or more of the social networking platforms.

13. The one or more computer-readable media of claim 12, wherein the identifying the one or more additional items comprises identifying the one or more of the items based at least in part on the information on the social activities of the in-store customer and at least in apart on the shopping history of the in-store customer.

14. The one or more computer-readable media of claim 8, further comprising:
indicating the one or more of the items on a map of the brick and mortar store displayed on the one or more computing devices.

15. An apparatus comprising:
a memory configured to store data and one or more sets of instructions; and
one or more processors coupled to the memory, the one or more processors configured to execute the one or more sets of instructions and perform operations comprising:
receiving (a) store information specific to a brick and mortar store from a store information database, and (b) customer information associated with an in-store customer from a customer information database, wherein:
the store information comprises a price rollback, a store floor plan, and a stocking plan showing where items are displayed on particular shelves within the brick and mortar store; and
the customer information comprises one or more previous orders, demographics, shopping history, social networking platforms, and shopping patterns of one or more other customers;
transmitting instructions for displaying the store information and the customer information to one or more computing devices of store sales associates working at the brick and mortar store to provide shopping suggestions and to personalize discounts to the in-store customer associated with a customer service transaction at the brick and mortar store, the customer service transaction comprising an in-store pickup, a return, or an exchange;
transmitting instructions for displaying locations of one or more of the items on a map of the brick and mortar store to be displayed on user interfaces of the one or more computing devices of the store sales associates to present to the in-store customer;
personalizing a custom discount based on one or more shopping patterns of one or more other customers for the one or more of the items frequently purchased by the one or more other customers and the in-store customer;
identifying one or more additional items for sale at an additional discount to the in-store customer as a recommendation for the in-store customer based on the store information and the customer information, wherein the one or more additional items, as recommended, comprise one or more products, accessories, or services available in the brick and mortar store;
analyzing the store information to determine a location of the one or more of the items and the one or more additional items within the brick and mortar store; and
transmitting instructions for changing the user interfaces of the one or more computing devices of the store sales associates to add additional locations of the one or more additional items on the map of the brick and mortar store so that the store sales associates can present the additional locations to the in-store customer.

16. The apparatus of claim 15, wherein the customer information associated with the in-store customer further comprises customer information associated with the one or more other customers stored in the customer information database, and wherein the store information specific to the brick and mortar store comprises information on store-specific deals.

17. The apparatus of claim 15, wherein the one or more additional items comprise the one or more products, accessories or services available in the brick and mortar store and relevant to the in-store customer based on the store information and the customer information.

18. The apparatus of claim 15, wherein the customer information associated with the in-store customer comprises information on social activities of the in-store customer at one or more of the social networking platforms.

19. The apparatus of claim 18, wherein the identifying the one or more additional items comprises identifying the one or more additional items based at least in part on the information on the social activities of the in-store customer.

20. The apparatus of claim 15, wherein the one or more processors are configured to further perform operations comprising:
identifying the one or more additional items for sale at a discount to the in-store customer based at least in part on the shopping history of the in-store customer.

* * * * *